US010614851B1

(12) United States Patent
Itagaki et al.

(10) Patent No.: US 10,614,851 B1
(45) Date of Patent: Apr. 7, 2020

(54) VERIFICATION OF DATA ON TAPE STORAGE SYSTEM

(71) Applicant: INTERNATIONAL BUSINESS MACHINES CORPORATION, Armonk, NY (US)

(72) Inventors: Hiroshi Itagaki, Yokohama (JP);
Tsuyoshi Miyamura, Yokohama (JP);
Shinsuke Mitsuma, Machida (JP);
Noriko Yamamoto, Tokyo (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/420,386

(22) Filed: May 23, 2019

(51) Int. Cl.
*G11B 20/18* (2006.01)
*G11B 20/10* (2006.01)
*G11B 20/12* (2006.01)
*G11B 5/48* (2006.01)
*G11B 5/008* (2006.01)
*G11B 5/55* (2006.01)

(52) U.S. Cl.
CPC .... *G11B 20/10388* (2013.01); *G11B 5/00813* (2013.01); *G11B 5/4893* (2013.01); *G11B 5/5508* (2013.01); *G11B 20/1202* (2013.01); *G11B 2220/90* (2013.01)

(58) Field of Classification Search
CPC .......... G11B 5/00; G11B 27/36; G11B 20/12; G11B 5/54; G11B 20/18; G11B 5/584; G11B 5/588; G11B 5/5513; G11B 5/5517

USPC .................. 360/25, 31, 48, 53, 77.12, 78.02
See application file for complete search history.

(56) References Cited

U.S. PATENT DOCUMENTS

| | | | |
|---|---|---|---|
| 10,304,489 B1 * | 5/2019 | Hoerger | ................. G11B 20/18 |
| 2016/0012073 A1 | 1/2016 | Ashida | |
| 2016/0093317 A1 | 3/2016 | Stiarwalt | |
| 2018/0053524 A1 | 2/2018 | Wang | |

OTHER PUBLICATIONS

Mell et al., "The NIST Definition of Cloud Computing", National Institute of Standards and Technology, Special Publication 800-145, Sep. 2011, pp. 1-7.

* cited by examiner

*Primary Examiner* — Nabil Z Hindi
(74) *Attorney, Agent, or Firm* — Alexis N. Hatzis

(57) ABSTRACT

A method, computer system, and a computer program product for verifying data written to a tape is provided. The present invention may include preparing a first group of data to be written to the tape; signaling a tape drive to perform a write operation to write the first group of data to the tape; receiving from the tape drive a tape head location signal, wherein the tape head location signal indicates that the tape drive has detected that the tape movement during the write operation has reached a turnaround point; performing a read operation to read the first group of data from the tape; receiving from the tape drive a second group of data read by the tape drive during the read operation; and comparing the first group of data to the second group of data.

20 Claims, 9 Drawing Sheets

VERIFICATION OF DATA ON TAPE STORAGE SYSTEM

BACKGROUND

The present invention relates generally to the field of computing, and more particularly to tape storage systems.

A tape drive (i.e., a tape storage system) may be a data storage device that reads and/or writes data onto a magnetic tape. The magnetic tape may be a magnetized coating on a thin plastic strip upon which data is written. Data may be written to a tape drive in one continuous stream. To read data from the tape drive, the tape may be wound past all preceding data on the tape. A read/write head may be a component of a tape drive which is responsible for reading and/or writing data to the tape drive.

A tape drive may confirm the data which has been written to the tape drive by reading the data using a read head placed in line with a write head. In certain circumstances, the user may not desire to check the data within the tape drive, but to read the data back from the tape media to a user system, and at that point compare the data on the tape drive with the original data. This operation may be referred to as a verify operation and may be done by reading back the data from the tape drive to the user system and comparing the data which is read back from the tape drive with the original data.

SUMMARY

Embodiments of the present invention disclose a method, computer system, and a computer program product for verifying data written to a tape. The present invention may include preparing a first group of data to be written to the tape; signaling a tape drive to perform a write operation to write the first group of data to the tape; receiving from the tape drive a tape head location signal, wherein the tape head location signal indicates that the tape drive has detected that the tape movement during the write operation has reached a turnaround point that is within a first distance of the beginning point of the tape; performing a read operation to read the first group of data from the tape; receiving from the tape drive a second group of data read by the tape drive during the read operation; and comparing the first group of data to the second group of data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
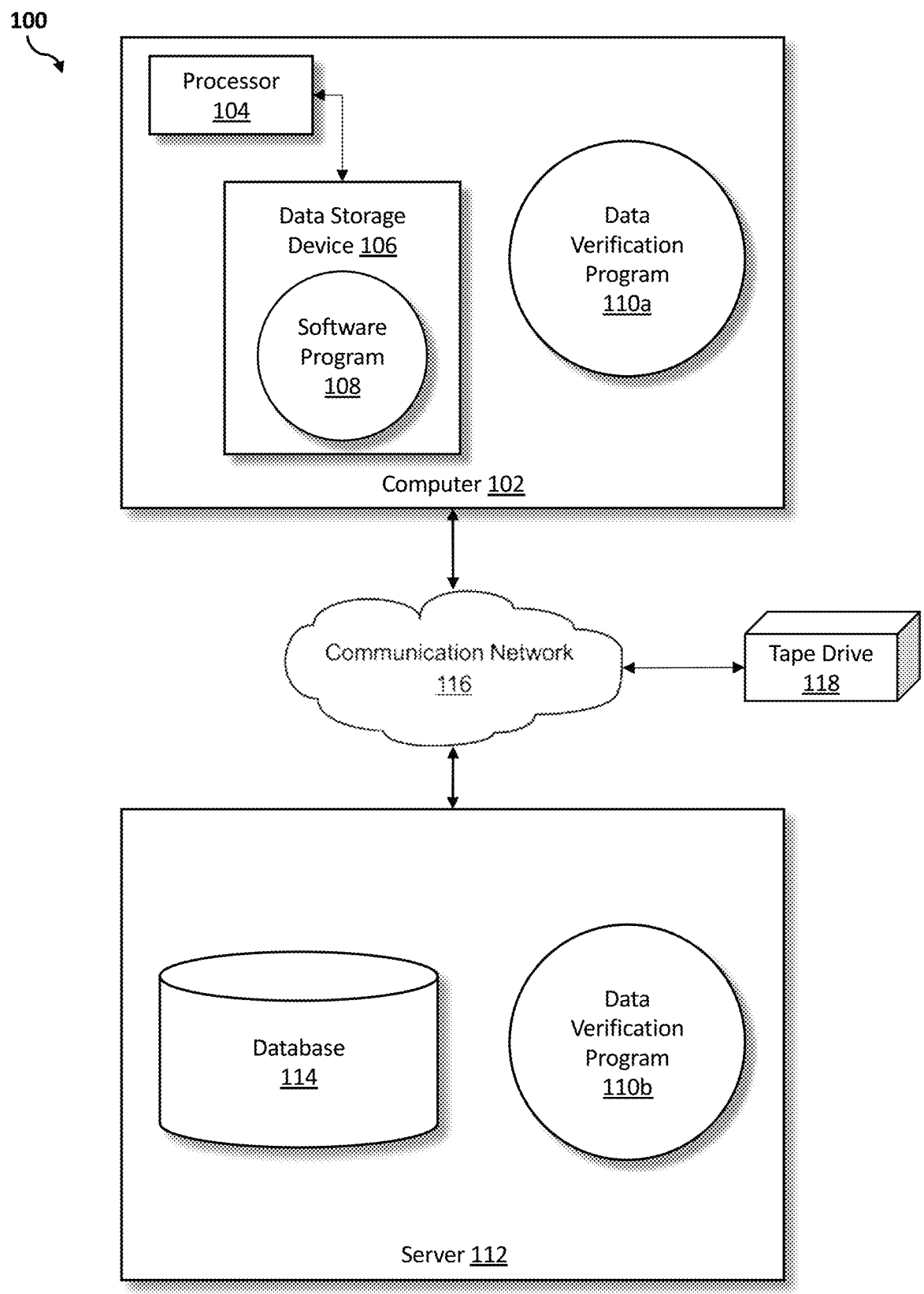
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for verifying data written to a tape. As such, the present embodiment has the capacity to improve the technical field of tape storage systems by performing a verification operation using the timing of one round of forward and backward tape operations. More specifically, the present invention may include preparing a first group of data to be written to the tape; signaling a tape drive to perform a write operation to write the first group of data to the tape; receiving from the tape drive a tape head location signal, wherein the tape head location signal indicates that the tape drive has detected that the tape movement during the write operation has reached a turnaround point that is within a first distance of the beginning point of the tape; performing a read operation to read the first group of data from the tape; receiving from the tape drive a second group of data read by the tape drive during the read operation; and comparing the first group of data to the second group of data.

As described previously, a tape drive (i.e., a tape storage system) may be a data storage device that reads and/or writes data onto a magnetic tape. The magnetic tape may be a magnetized coating on a thin plastic strip upon which data is written. Data may be written to a tape drive in one continuous stream. To read data from the tape drive, the tape may be wound past all preceding data on the tape. A read/write head may be a component of a tape drive which is responsible for reading and/or writing data to the tape drive.

A tape drive may confirm the data which has been written to the tape drive by reading the data using a read head placed in line with a write head. In certain circumstances, the user may not desire to check the data within the tape drive, but to read the data back from the tape media to a user system, and at that point compare the data on the tape drive with the original data. This operation may be referred to as a verify operation and may be done by reading back the data from the tape drive to the user system and comparing the data on the tape drive with the original data.

However, since a tape drive is a sequential device, meaning that data on the tape drive may be read in a sequence, many rewind operations may be required for the tape drive to perform a verify operation. This may impact performance of the tape drive's operation. Therefore, it may be advantageous to, among other things, reduce the number of rewind operations required to perform a verify operation, and thus reduce the impact in performance of the tape drive's operation.

According to at least one embodiment of the present invention, the data verification program may minimize the number of rewind operations required to perform a verify operation by utilizing the tape drive's native characteristic of recording data onto the tape drive in a back and forth motion, from one end to the other. The data verification program may write on one forward path and one backward path and may then perform a verify operation for the data written in the previous operation.

According to at least one embodiment of the present invention, the data verification program may keep track of the recording position of the tape drive by receiving a notification when the writing direction is changed from backward to forward (e.g., from back to forth). By utilizing the present invention, the tape drive may perform a verify operation upon the detection of a change in direction and may change from writing data to verifying data.

According to at least one embodiment, when features of the present invention are implemented on a data verification system that writes data to a tape medium using a tape drive in accordance with a request from a user, it may be possible to efficiently implement a verify feature according to which data, previously written to the tape, is read back for comparison-based verification.

According to at least one embodiment of the present invention, and taking into account an average compression ratio, the data verification system may ensure a cache area which is three times as large as the amount of data which may be written to a tape by one round of forward and backward tape operations. For example, the capacity may be 125 Gigabytes (GB) for an IBM TS1150 tape drive and 115 GB for an LTO8 tape drive. In this instance, the cache size may be three times the capacity. Three may be an average compression ratio for a given file (e.g., a text file, a picture, a movie file, and/or a zipped file), meaning that a 100 GB file may occupy 33.3 GB of space on a tape drive since the tape drive may be automatically compressing the incoming data at a compression ratio of three times the incoming data. However, a compression ratio may vary with each file. For example, a zipped file may have a lower compression ratio than a text file (e.g., about one time the incoming data) since the data in the zipped file may already be compressed.

According to at least one embodiment of the present invention, the size of a cache area may differ depending on a format of the tape.

According to at least one embodiment of the present invention, for a hierarchical storage management (HSM) system, such as IBM Spectrum Archive Enterprise Edition, among others, files may be temporarily stored on a disk and later migrated to a tape. In the case of HSM's, a dedicated cache area may not need to be provided.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data verification program 110a. The networked computer environment 100 may also include a server (i.e., host) 112 that is enabled to run a data verification program 110b that may interact with a database 114 and a communication network 116. The networked computer environment 100 may include a plurality of computers 102 and servers 112, only one of which is shown. The networked computer environment 100 may also include a tape drive 118. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data verification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data verification program 110a, 110b (respectively) to perform a verification operation using the timing of one round of forward and backward tape operations. The data verification method is explained in more detail below with respect to FIGS. 2A through 4.

Figure 2A:
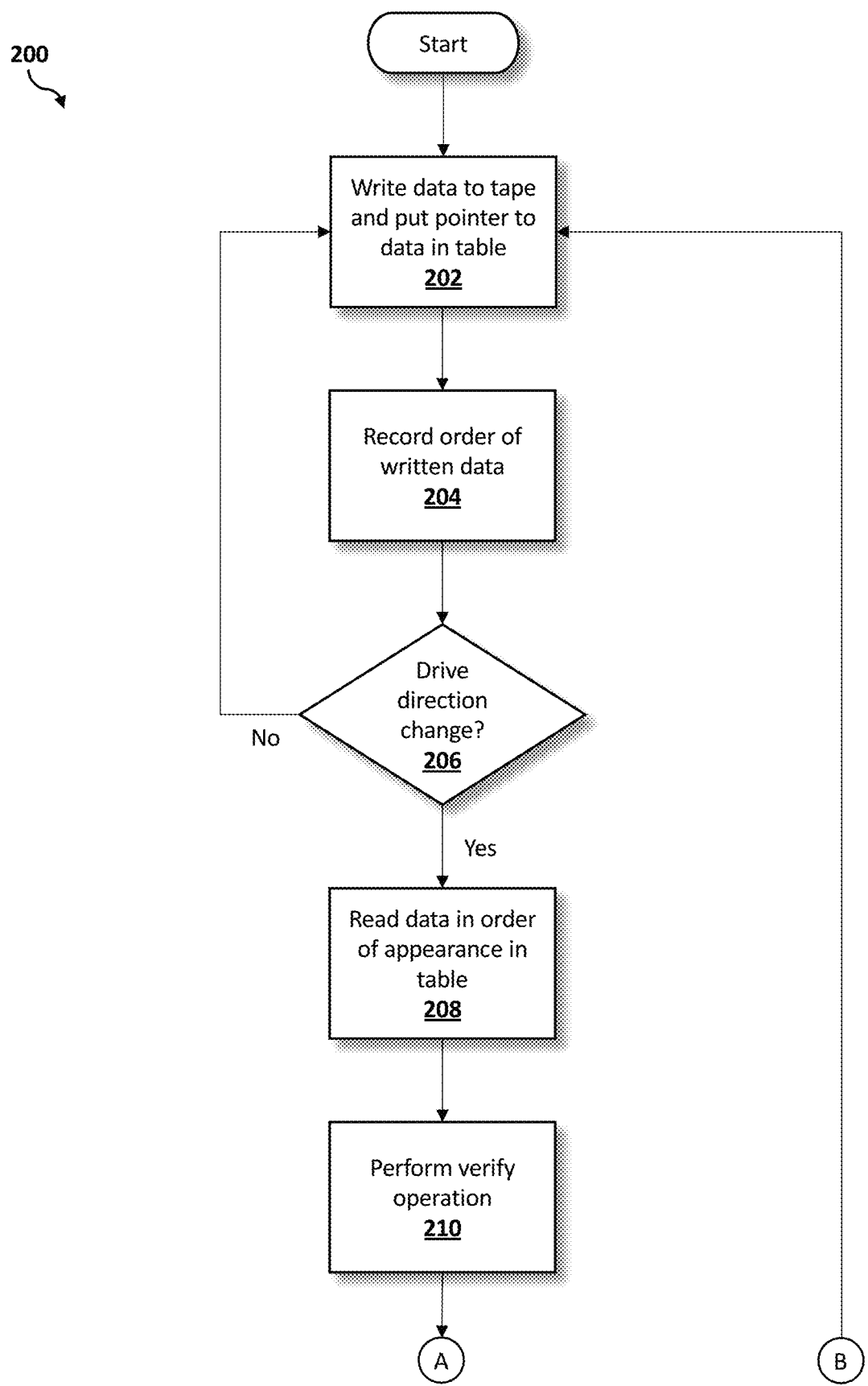
FIGS. 2A and 2B are an operational flowchart illustrating a process for data verification according to at least one embodiment.
Figure 2B:
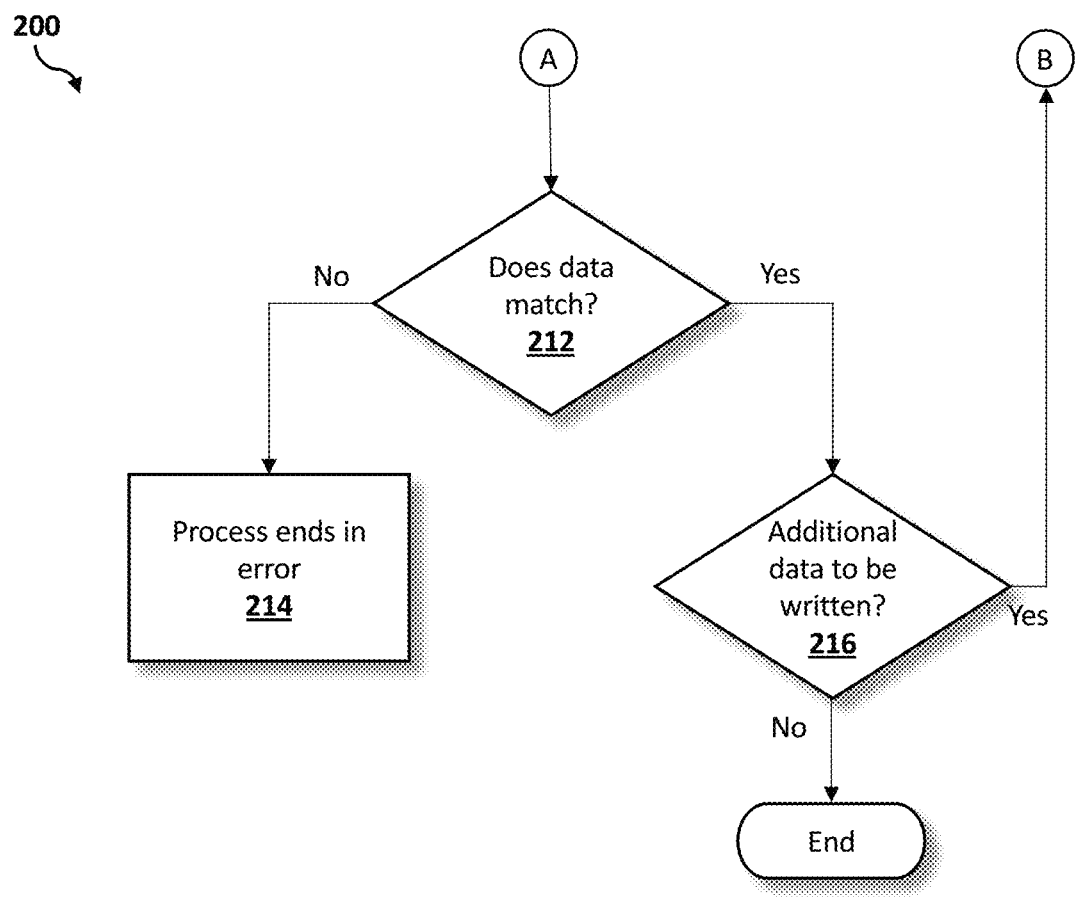

Referring now to FIGS. 2A and 2B, an operational flowchart illustrating the exemplary data verification process 200 used by the data verification program 110a and 110b according to at least one embodiment is depicted.

At 202, the data verification program 110a, 110b writes data to a tape and places a pointer to the data in a table. When the data verification program 110a, 110b has received a user's request to record data onto a tape, the data verification program 110a, 110b may write the requested data to the tape and at the same time may copy the data into a cache (i.e., a cache storage unit) having a capacity equal to or larger than an amount of data that may be recorded in a write operation. In an embodiment, the data verification program 110a, 110b signals a tape drive to perform a write operation to write data to the tape. A cache may be a hardware or software component, e.g., RAM 908 or storage 914, which stores data for faster access to the data on a future request. The version of the data recorded on the tape may be referred to as a "first group" of data and the version of data stored in the cache may be referred to as a "second group" of data. For example, if the data is recorded to tape accurately, the first and second groups will be identical.

The pointer referenced here may be a filename, based on the fact that the cache may contain multiple files. While performing a verification operation, as will be discussed in more detail below with respect to step 210, the data verification program 110a, 110b may need to choose a file from the cache (i.e., a second group of data) to compare with the data read from the tape (i.e., a first group of data). By using a filename as a pointer to the data, the data verification program 110a, 110b may choose the correct group of data to compare.

The table referenced here may be located in a temporary memory location residing in the same location as the data verification program 110a, 110b. The table may be kept until the verification operation discussed at step 210 is completed and may not need to reside here permanently.

At 204, the order of written data is recorded. Data may be recorded in the order in which the data was copied into a cache. The order in which the data was copied into the cache may be the same as the order in which the data was written to the tape. For example, an initial record number for data written to the tape may be used to record the pair of a record number and an identifier of the data, such as a file name, in a table. A record number may refer to one of the numbers that the tape drive assigns sequentially to data that has been written to the tape drive.

In various embodiments, data may be written from a beginning of a tape to an end of a tape. The beginning of the tape may signify a location where the recording begins, and the end of the tape may be a location on the tape which is opposite to the beginning of the tape. In some embodiments, the beginning and ending locations on the tape may be, or may be close, to a physical end of the tape, though this is not required. The tape media may be wound reels and may move relative to a read/write head.

If, at 206, the data verification program 110a, 110b determines that there is no change in direction of the tape movement, then as described previously at 202, data is written to the tape and a pointer to the data is put in a table, and the order of written data is recorded, as described previously at 204. Once the data verification program 110a, 110b signals a tape drive to perform a write operation, the tape drive will cause a read/write head to be aligned with a first track. The tape drive will cause the tape to move with respect to the read/write head in a first direction from a beginning point to an ending point of the tape. In addition, after reaching the ending point, the tape drive will cause the read/write head to align with a second track and then move the tape with respect to the read/write head from the ending point in a direction (a second direction) opposite to the first direction. The tape drive will cause the tape to move in the second direction until the tape drive determines to change direction in order to commence a read verify operation. All of these operations are performed by the tape drive in response to receiving a signal from the data verification program 110a, 110b. It should be understood that the data verification program 110a, 110b is not aware of any of these operations unless notified or signaled by the tape drive. For example, the data verification program 110a, 110b is not aware of a read/write head being aligned with a different track or the tape movement being changed to the second direction from the first direction. Accordingly, the operation 206 (determining that there is no change in direction of tape movement in order to commence a read verify operation) may include receiving a signal from the tape drive that indicates that tape movement during the write operation has reached a turnaround point that is within a first distance of the beginning point of the tape. This operation 206 may be repeated until data by an amount corresponding to the amount of data that can be written by one round of forward and backward write operations (e.g., tape movement in the first and second directions) is written to the tape. An amount corresponding to one round of forward and backward write operations may depend on reaching a "turnaround point" on the tape, i.e., a point where the direction of tape movement is changed in order to commence a read verify operation.

A direction change may be determined based on approaching a turnaround point that is within a first distance (e.g., within a threshold or tolerance) of the beginning point of the tape, and further based on a file size recorded to the tape. For example, consider a 1 GB zipped file with a compression ratio of one (e.g., the file is already compressed) and an LTO8 tape drive. An LTO8 tape drive has a 12 TB total capacity, 6,656 tracks, a 32-channel head and 208 sets of tracks to read and write. A first set of tracks may have a capacity of 57.7 GB (12 TB/208 sets of tracks). Since the length of the tape may be 960 meters, the 1 GB zipped file may use $\frac{1}{57}^{th}$ of the 960 meters. In this example, the first distance may be equal to about 18.64 meters and a turnaround point may be a point within this distance from a beginning or ending point of the tape. In various embodiments, a tape may have a capacity to store a first quantity of data during the write operation, and the first distance is a longitudinal distance on the tape that corresponds with a second quantity of data that can be stored on one track. As one example, the second quantity of data may be less than or equal to one percent of the first quantity of data. Other examples include 0.5%, 1.5%, and 2%. Any suitable threshold or tolerance may be selected as a first distance.

If, at 206, the data verification program 110a, 110b determines that there is a change in direction of the tape drive (e.g., by receiving a signal from the tape drive) this means that an amount of data corresponding to that which may be recorded by one round of forward and backward write operations may have been recorded and a turnaround point, as described previously, may have been reached.

When the data verification program 110a, 110b determines that there is a change in direction of the tape drive, then at 208, data is read in order of appearance in the table. The data read operation may be initiated in response to the data verification program 110a, 110b performing a read operation. Alternatively, the data read operation may automatically be initiated by the tape drive without receiving a command or signal from the data verification program 110a, 110b. The data corresponding to that residing in the cache may be sequentially read from the tape to compare the recorded first group of data to the second group of data residing in the cache. The recorded first group of data is read by moving the tape with respect to the read/write head aligned with the first track in the first direction from the beginning point to the ending point of the tape and, after reaching the ending point, aligning the read/write head with the second track and moving the tape with respect to the read/write head from the ending point in the direction opposite to the first direction to the turnaround point. In some embodiments, the comparison of recorded data (i.e., a first group of data) to data residing in the cache (i.e., a second group of data) may comprise comparing a hash value calculated from a string of data of the first group of data with a hash value calculated from a corresponding string of data of the second group of data. A hash value may be unique numeric value that identifies the first group and/or the second group of data and may be calculated by a mathematical hashing algorithm. In other embodiments, the first group may be compared with the second group of data byte by byte.

At 210, a verify operation is performed. A verify operation may be done by reading back data and comparing it with original data after writing data to the tape. At this step, the verify operation may compare a first group of data written to the tape to a second group of data read by the tape drive during the read operation and stored in the cache. The data verification program 110a, 110b may perform a verify operation by utilizing the tape drive's native characteristic of recording data onto the tape drive in a backward and forward motion (e.g., from one end of a track to the other). The data verification program may write on one forward path and one backward path and may then perform a verify operation for the data written in the previous operation. Upon completion of step 210, the second data for which comparison (e.g., verification) has been completed may be deleted from the cache.

The verify operation may be performed at a time when the amount of data corresponding to that which can be recorded by one round of forward and backward write operations has been recorded, thus redundant rewinding may not take place and it may be possible to suppress any adverse effect on the data verification program's 110a, 110b performance.

When the verify operation has been completed, recording of new data may be continued. However, in instances where a verify operation is not successful (e.g., the verify command fails), the comparing of the first group of data to the second group of data may be halted. A data verification error task may be performed in this case, including but not limited to generating an error message, which may indicate to a user that the verify operation was not completed.

If, at 212, the data verification program 110a, 110b determines that the original data and the cached data do not match, then at 214 the process ends in error and a data verification error task may be performed. The data verification error task may include repeating the write operation for this group of data, generating a user message, or both.

Alternatively, if, at 212, the data verification program 110a, 110b determines that the original data and the cached data do match, then at 216 it is determined whether there is additional data to be written. If, at 216, the data verification program 110a, 110b determines that there is additional data to be written, then the data verification program 110a, 110b repeats with step 202 and recording of new data may be continued.

Alternatively, if, at 216, the data verification program 110a, 110b determines that there is no additional data to be written, then the process ends.

For example, the data verification program 110a, 110b may be implemented on an IBM Spectrum Archive™ Enterprise Edition (LTFSEE). IBM Spectrum Archive™ may be a member of the IBM Spectrum™ family which may provide access to data stored in IBM tape drives and libraries by incorporating the Linear Tape File System™ (LTFS) format standard for reading, writing and exchanging descriptive metadata on formatted tape cartridges. IBM Spectrum Archive™ Enterprise Edition may be a hierarchical storage management (HSM) system in which files may be recorded in disk storage and later migrated to tape storage under a predetermined condition or conditions. As such, a cache area may not need to be provided for this implementation. For a non-hierarchical storage management (HSM) system, a cache area having space on the hard disk which is in accordance with the types of tapes in use may be required.

In the IBM Spectrum Archive™ Enterprise Edition, a migration command may be responsible for writing data to the tape. Data may be written to the tape in units of files. After the files have been written to the tape, the files may be converted into stubs. With the data verification program 110a, 110b, files may be converted into stubs after performing a verify operation. Since the files are used in the course of a verify operation, the order of the file names may be recorded when the files are written to the tape.

The tape drive may report or signal to the host that data has been written by the amount corresponding to that which can be recorded by one round of backward and forward write operations. This reporting or signaling may be implemented using the same or a similar scheme to the early warning scheme. The early warning feature may determine that a remaining capacity of the tape is low according to the current write position on the tape. The early warning feature may return CheckCondition in response to a write command and the same or similar report may be acquired by specifying the write position triggering this determination as the tape position corresponding to the one round of forward and backward operations.

The early warning scheme, or a similar scheme, may be a feature of tape drives. When the tape is nearing capacity, the early warning scheme, or a similar scheme, may return CheckCondition for a write operation. This may alert the application to the fact that the tape is nearing capacity and that a limited amount of data may be written. The early warning scheme, or a similar scheme, may monitor the position on the tape where data is being written in order to know that a point on the tape (e.g., a switch point) has been reached which requires a CheckCondition. The present invention may utilize a similar monitoring technique, and may begin a verify operation at the time that the switch point has been reached.

A new SCSI command may be provided to report or signal "the first switching event from forward to backward operations which may occur after the current location." The new command may be issued to the data verification program 110a, 110b after a data write position approaches the switching point from backward to forward. At this time, the drive may send a report to the data verification program 110a, 110b in accordance with the above-described scheme. When the data verification program 110a, 110b has received the report from the drive, and upon completion of the writing of the file, the data verification program 110a, 110b may switch to a verify operation.

The data verification program 110a, 110b may read files from the tape in the order the files are recorded at the time of the write operation, as described previously with respect to step 210 above, in order to compare the files to the files remaining on the disk. Since the files may be read in the order in which the files are recorded to the tape, no rewinding of the tape may be required. If the comparison is not successful, as described previously with respect to step 212 above, then the migration command may fail and the process may end in error, as described previously with respect to step 214 above.

The verify operation may permit a user to specify whether the verification should be performed using a conventional migration command or using a new command (e.g., a VerifyMigration command).

It should be noted that a turnaround point convenient for writing operations may not coincide with one round of forward and backward write operations. As such, some data may be written to the next forward path, and the probability of occurrence rewinding may not be zero. However, the distance may be small, and the rewind time may be reduced.

Since traditional methods may not take into account the position of the tape, the timing at which the writing of write data is completed may vary. By utilizing the data verification program 110a, 110b, a notification may be provided upon the switching of paths between the forward and backward paths, so that the variation may become smaller than in conventional schemes.

As a second example, consider the case where both the conventional and proposed schemes (e.g., the data verification program 110a, 110b) end the writing of the write data upon the switching between forward and backwards paths. Data processed with a set of write and verify operations is recorded in a tape and the write and verify operations are repeated for N rounds, where N rounds signifies that N sets of data were recorded during a one-way running of the tape. It is then assumed that the one-way length of the tape is L, the speed at which the tape runs is v, the speed at which the tape rewinds is 2v, and the time required for switching the running directions of the tape is w.

Using the conventional scheme, the time needed to write data by the amount of two rounds of forward and backward operations (e.g., by the amount of 4N sets of data) will be (L/N)/v for a write operation for the first set of data. Rewinding for the verify operation for the first set of data will be w+(L/N)/2v, and the verify operation for the first set of data will be (L/N)/v. The total time, represented by t, is $(5/2)*(L/N)/v+w$. The second to $N^{th}$ sets will also take time t. The $(N+1)^{th}$ set may need to change direction from a forward path to a backward path, and thus may take time w+t. The total time required for 4N sets of data, using the conventional scheme, is $N+3t(N-1)+3(t+w)=4Nt-3t+3t+3w=4Nt+3w=10L/v+(4N+3)w$.

By contrast, by utilizing the data verification program 110a, 110b, a write operation may take an amount of time equal to two rounds of backward and forward write operations. Specifically, by utilizing the data verification program 110a, 110b, t may equal $L/v+w+L/v+w+L/v+w+L/v=4L/v+3w$. The write operation may be followed by a verify operation, w, and again 4L/v+3w may be performed for the verify operation. Thus, the total time, t, may be $4L/v+3w+w+4L/v+3w=8L/v+7w$.

Based on the above, the difference between the conventional and proposed schemes (e.g., the data verification program 110a, 110b) is equal to $10L/v+(4N+3)w-(8L/v+7w)=2L/v+4w(N-1)>0$. By utilizing the data verification program 110a, 110b, the time needed to write data by the amount of two rounds of forward and backward operations may be reduced.

In a practical implementation, w may be in the order of w<5 seconds for L/v>100 seconds, so a reduction in time of several minutes may be expected.

Figure 3:
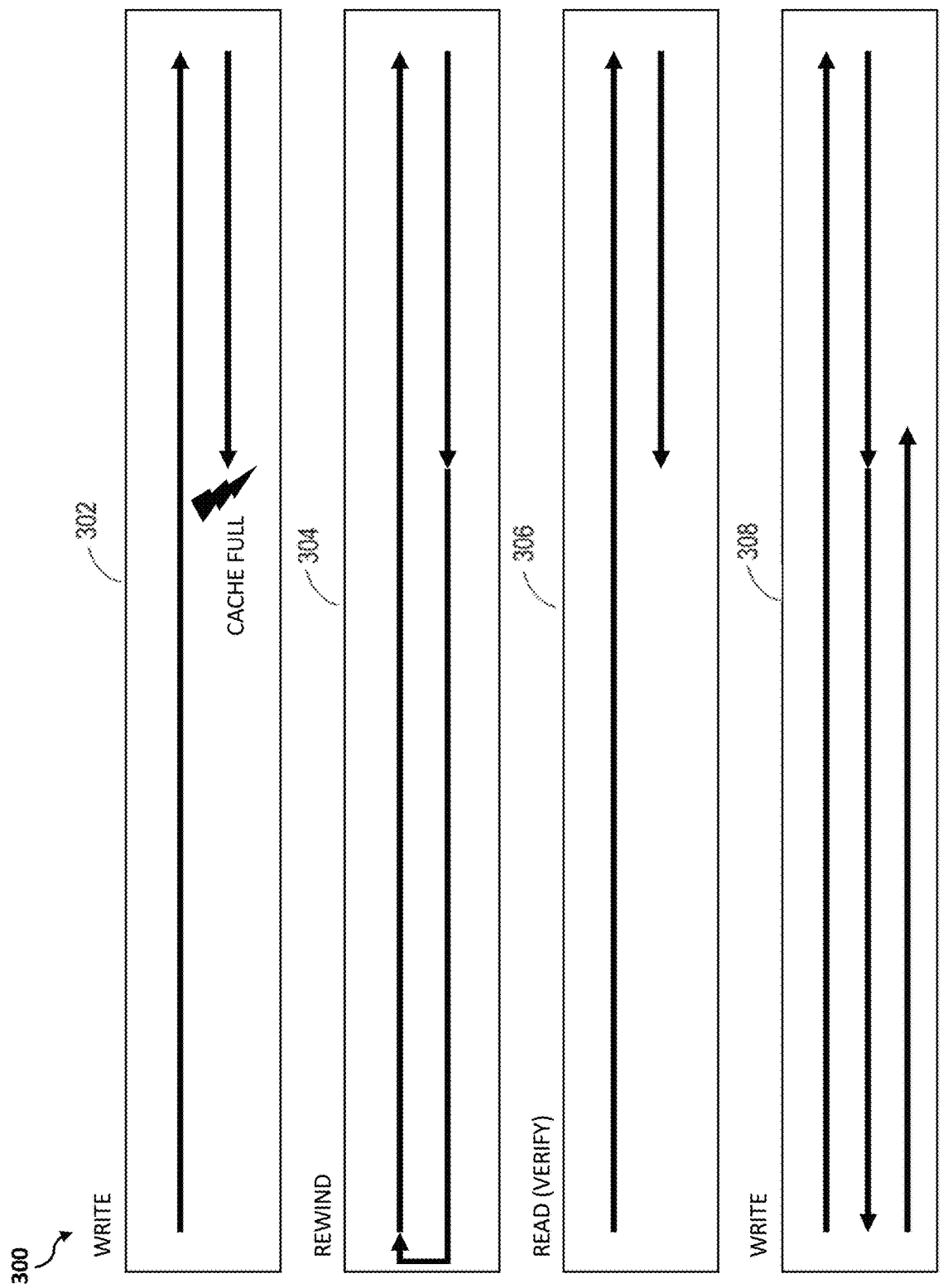
FIG. 3 is a block diagram of a media in the system which is not aligned to direction change according to at least one embodiment.

Referring now to FIG. 3, a block diagram of a media in the system which is not aligned to direction change 300 according to at least one embodiment is depicted. This may mean that cache is used but the recording position on the tape is not taken into account. Some conventional schemes may attempt to reduce the number of rounds of rewind operations which may be required by providing a cache area. In that case, the capacity of the cache area may act as a trigger causing the transition from a write operation to a read operation. When this happens, the position on the tape may not be taken into account. As a result, a rewinding or fast-forwarding operation may take place at the time of the transition. The media 302 shows a first write operation in which the tape is moved from a first point with respect to a read/write head in a first direction and in a second direction to the "cache full" point. The media 304 shows a rewind operation. The tape is rewound to the first point. The media 306 shows a read/verify operation. The media 308 shows a second write operation. In the example of FIG. 3, the rewind operation is for more than fifty percent of the tape length.

Figure 4:
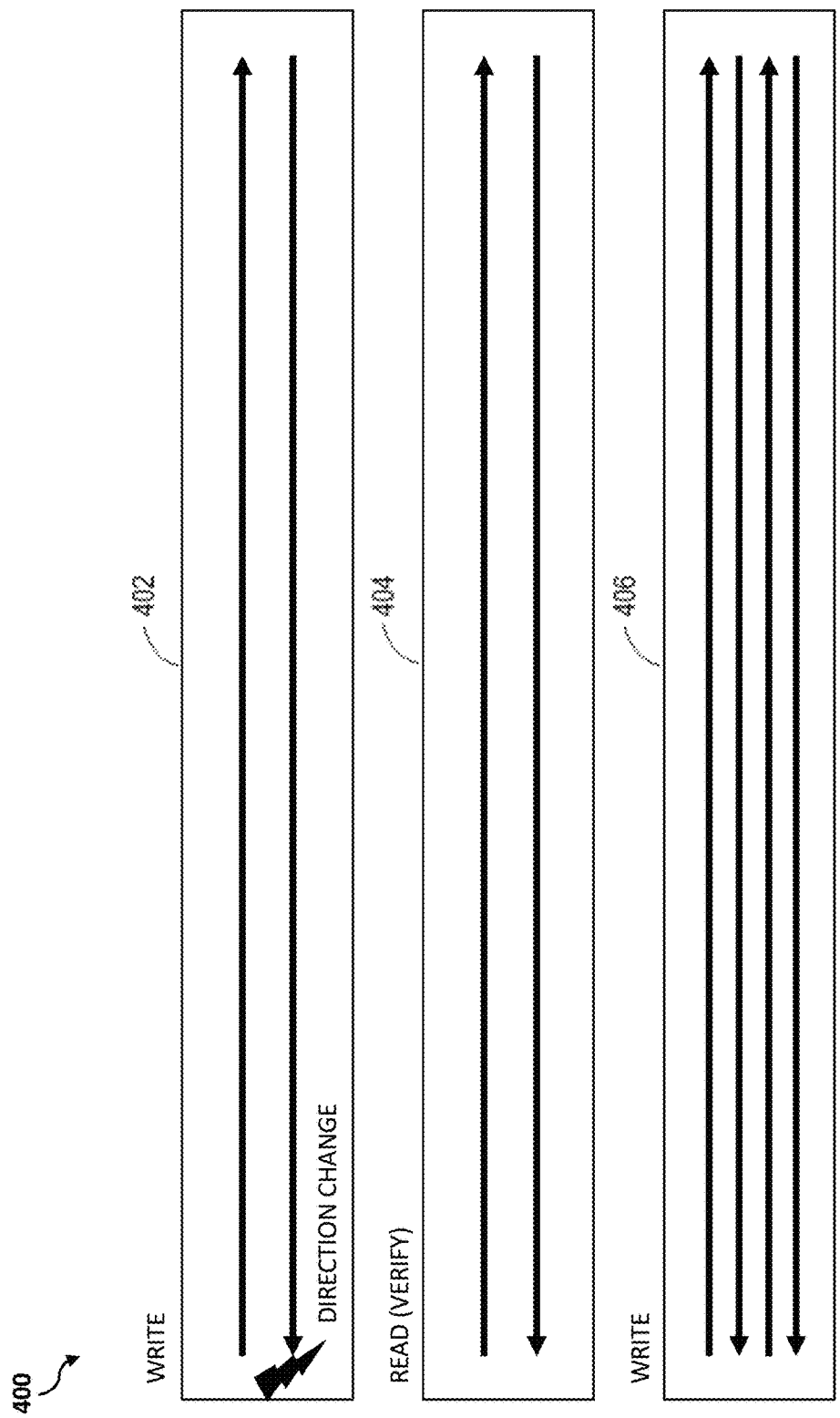
FIG. 4 is a block diagram of a media in the system which is aligned to direction change according to at least one embodiment.

Referring now to FIG. 4, a block diagram of a media in the system which is aligned to direction change 400 according to at least one embodiment is depicted. Here, a transition from a write operation to a verify operation may occur upon the recording of one round of backward and forward write operations, as described previously with FIG. 2. The media 402 shows a first write operation in which the tape is moved from a first point with respect to a read/write head in a first direction and in a second direction to the "direction change" or turnaround point. The shown first write operation may be in response to a signal to a tape drive to perform a write operation to write the first group of data to the tape. At the turnaround point, the tape drive may send a tape head location signal that indicates that tape movement during the write operation has reached a turnaround point. The media 402 shows that turnaround point is within a first distance of the beginning point of the tape. FIG. 4 does not show a rewind operation. In various embodiments, a relatively (in comparison to FIG. 3) short rewind operation may be required. A short rewind operation may correspond with a selected tolerance or threshold. The media 404 shows a read/verify operation. The media 406 shows a second write operation.

In the media 406, the top two lines depict data previously written and verified, while the third and fourth lines depict a second write operation.

It may be appreciated that FIGS. 2A-4 provide only an illustration of one embodiment and do not imply any limitations with regard to how different embodiments may be implemented. Many modifications to the depicted embodiment(s) may be made based on design and implementation requirements.

Figure 5:
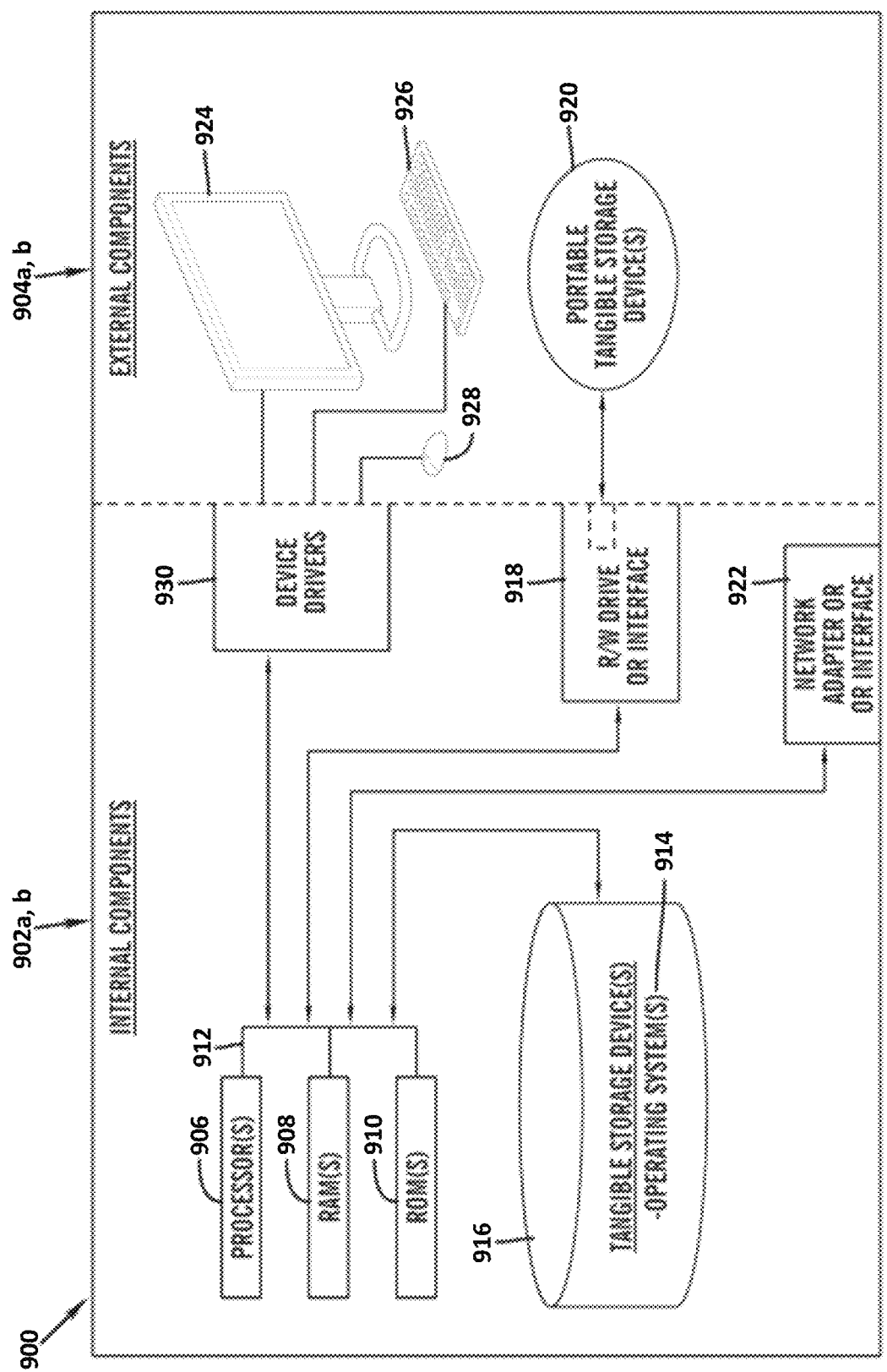
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data verification program 110a in client computer 102, and the data verification program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data verification program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the data verification program 110a in client computer 102 and the data verification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data verification program 110a in client computer 102 and the data verification program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
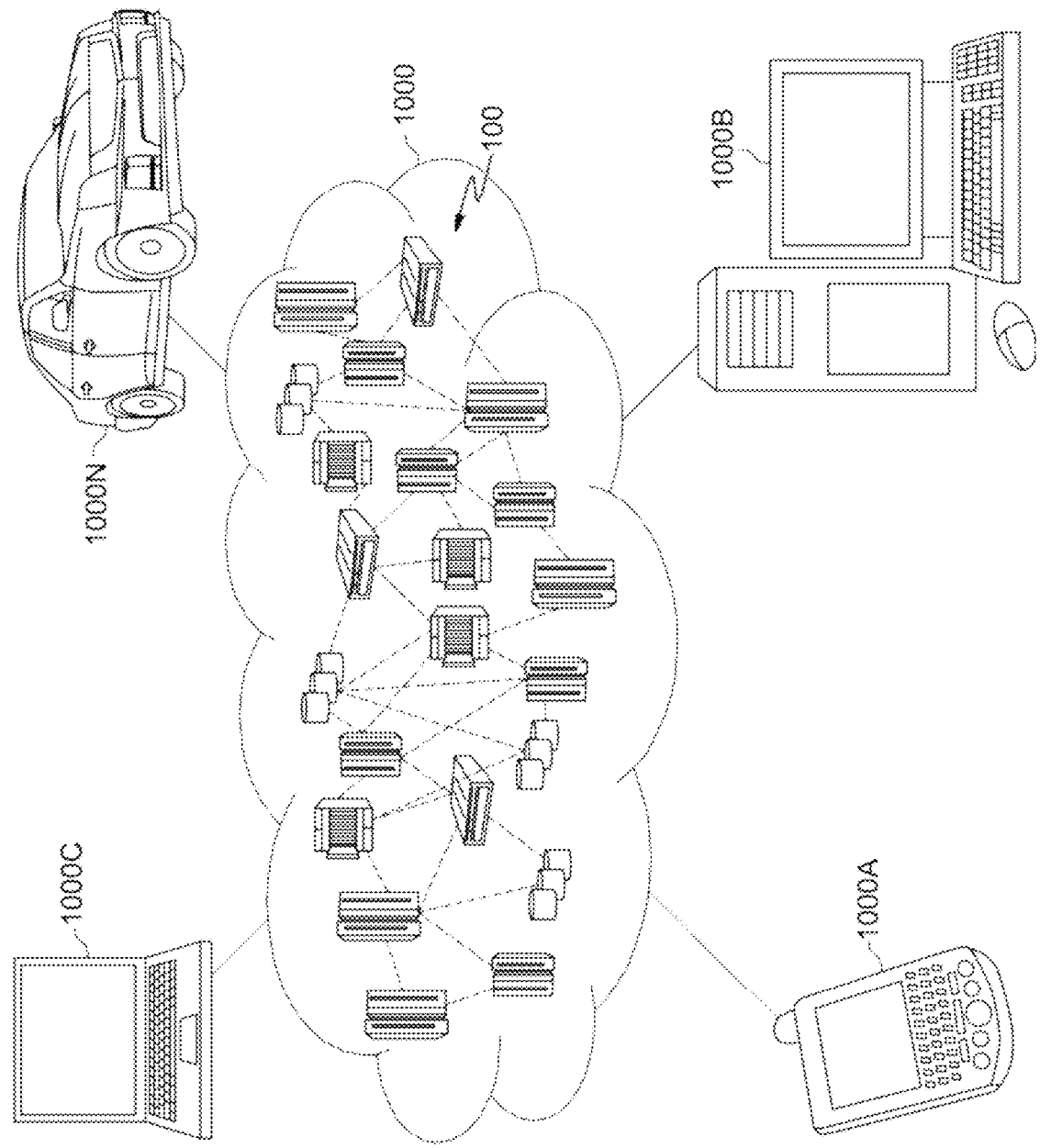
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
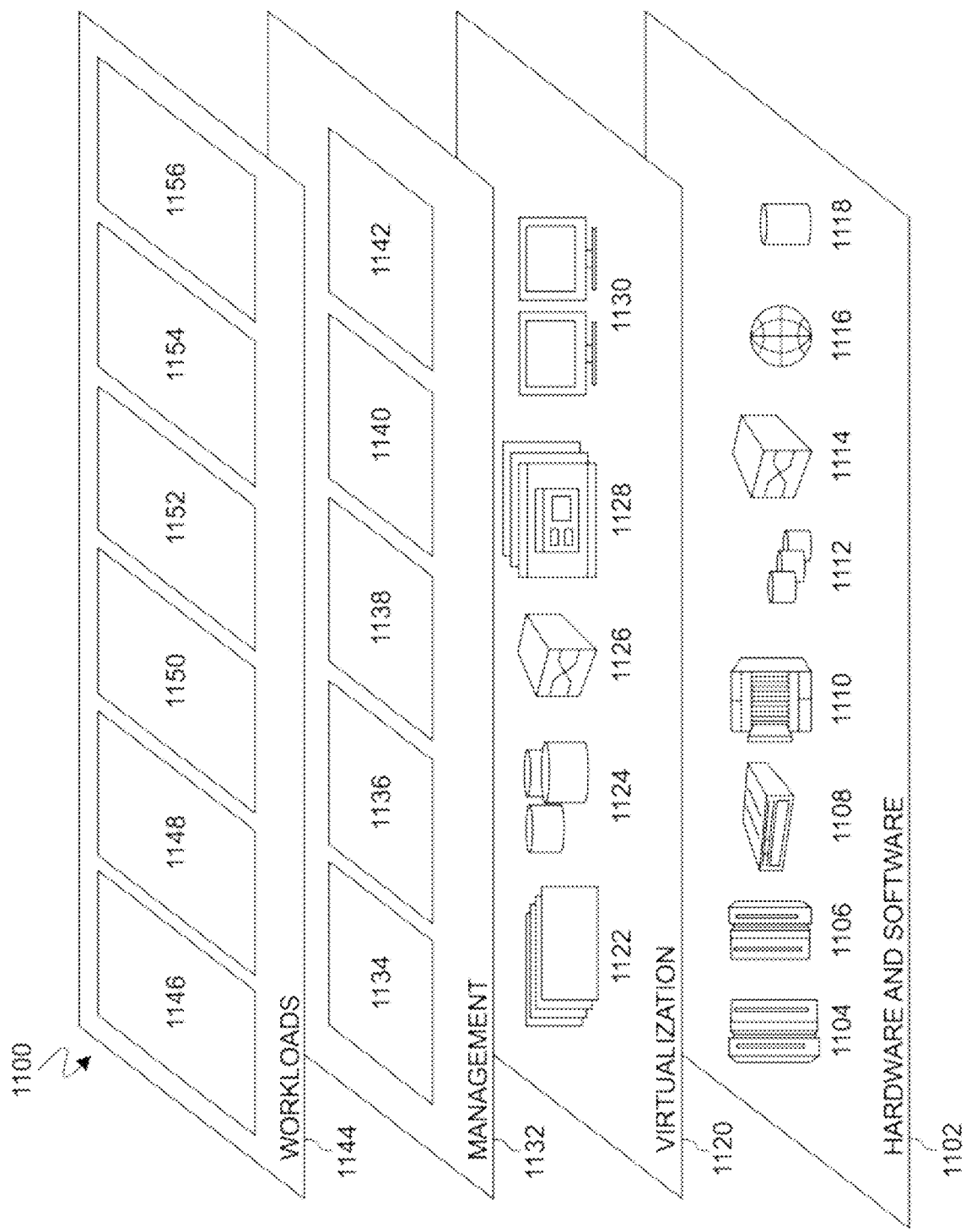
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data verification 1156. A data verification program 110a, 110b provides a way to perform a verification operation using the timing of one round of forward and backward tape operations.

Figure 8:
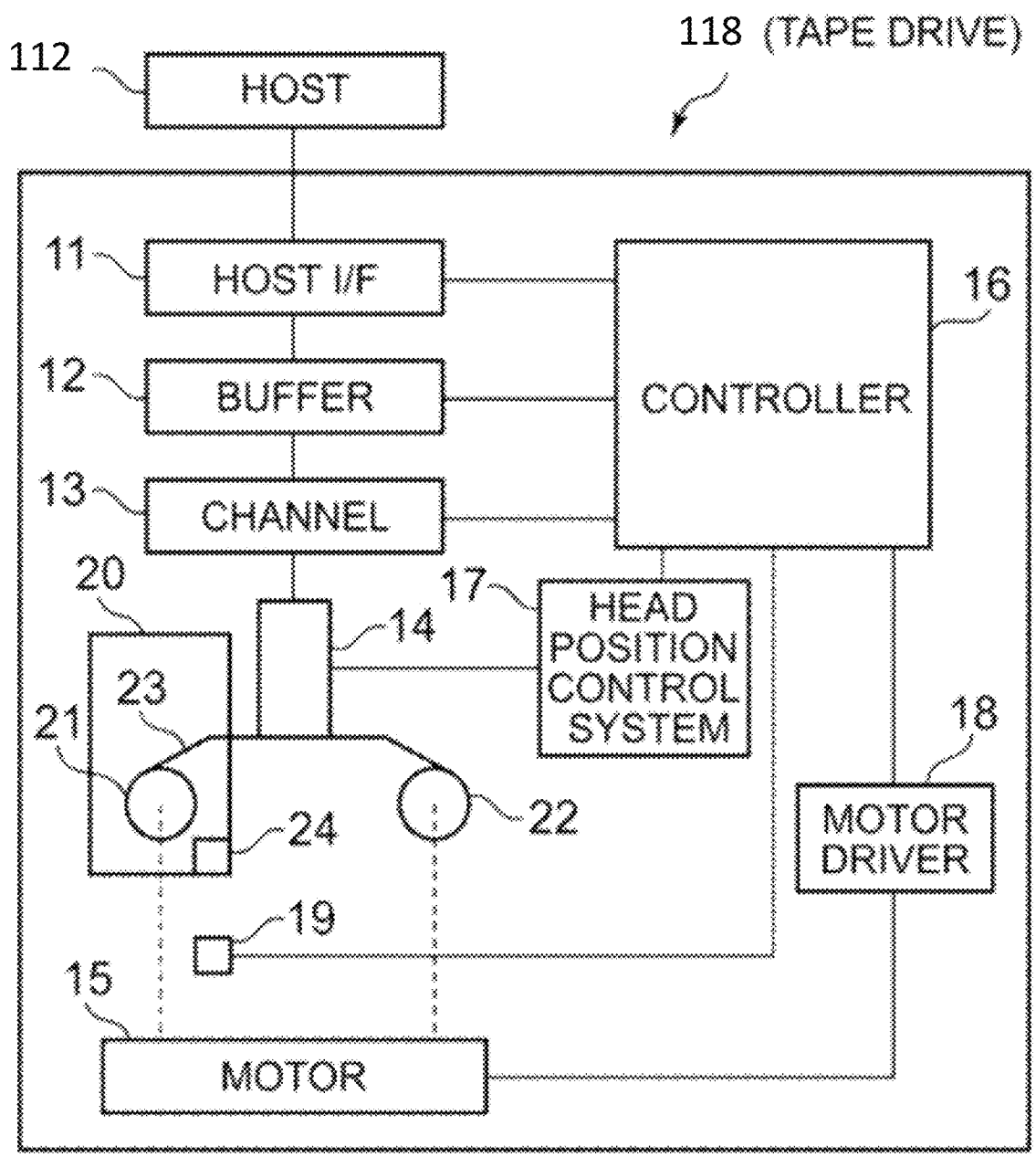
FIG. 8 is a block diagram of an example configuration of the tape drive in the networked computer environment of FIG. 1.

Referring now to FIG. 8, a block diagram of an example configuration of the tape drive 118 in the networked computer environment 100 of FIG. 1 is depicted. The tape drive 118 includes a host interface (hereinafter called "host I/F") 11, a buffer 12, a channel 13, a head 14, and a motor 15. The tape drive 118 also includes a controller 16, a head position control system 17, and a motor driver 18. Since a tape cartridge 20 is loadable when the tape cartridge 20 is inserted into the tape drive 118, the tape cartridge 20 is shown here. The tape cartridge 20 includes a tape 23 wound on reels 21 and 22. The tape 23 moves in a longitudinal direction with the rotation of the reels 21 and 22, from the reel 21 to the reel 22 or from the reel 22 to the reel 21.

The tape cartridge 20 also includes a cartridge memory (CM) 24. The CM 24 may record, for example, in a noncontact mode using an RF interface, information, for example, about how data was written on the tape 23. For example, an index written to CM 24 of data written on the tape 23 may be accessed in a noncontact mode to enable high-speed access to the data. An example RF interface for performing access to the CM 24 is shown as a cartridge memory interface (hereinafter referred to as "CM I/F") 19.

In an embodiment, the host I/F 11 communicates with the host (i.e., server) 112 or the computer 102. For example, the host I/F 11 receives, from an OS of the host (i.e., server) 112, a command, or request, to write data to the tape 23, a command to move the tape 23 to a target position, and a command to instruct reading of data from the tape 23. For example, as with a linear tape file system (LTFS), data on a tape mounted in the tape drive can be referenced directly from a desktop OS or the like, and the file can be executed by the double click or copied by the drag-and-drop action, similar to how a file is accessed on an HD.

The buffer 12 is a memory for accumulating data from host (i.e., server) 112 to be written to the tape 23, or for accumulating data read from the tape 23 to be transmitted to host (i.e., server) 112. For example, the buffer 12 is made up of a DRAM. Further, the buffer 12 is composed of multiple buffer segments, where each buffer segment stores a dataset as a unit of reading from or writing to the tape 23.

The channel 13 is a communication channel used to send the head 14 data to be written to the tape 23 or to receive, from the head 14, data read from the tape 23. The head 14 writes information to the tape 23 or reads information from the tape 23 when the tape 23 moves in the longitudinal direction. The motor 15 rotates the reels 21 and 22. Although the motor 15 is represented by one rectangle, it is preferable to provide one motor for each of the reels 21 and 22 (i.e., two motors in total).

The controller 16 controls the tape drive 118. For example, the controller 16 controls writing of data to the tape 23 and reading of data from the tape 23 according to the commands accepted at the host I/F 11. The controller 16 also controls the head position control system 17 and the motor driver 18. The head position control system 17 is a system for keeping track of a desired wrap. Here, wrap means a group of multiple tracks on the tape 23. When it is necessary to switch from one wrap to another, the head 14 also needs to be electrically switched. Such switching is controlled by the head position control system 17.

The motor driver 18 drives the motor 15. As mentioned above, if two motors 15 are used, two motor drivers 18 will be provided. The CM I/F 19 is, for example, implemented by an RF reader/writer to write information to the CM 24 and read information from the CM 24.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verifying data written to a tape, the method comprising:
   preparing a first group of data to be written to the tape, the tape having a plurality of longitudinal tracks;
   signaling a tape drive to perform a write operation to write the first group of data to the tape by:
      moving the tape with respect to a read/write head aligned with a first track in a first direction from a beginning point to an ending point of the tape and, after reaching the ending point,
      aligning the read/write head with a second track and moving the tape with respect to the read/write head from the ending point in a direction opposite to the first direction;
   receiving from the tape drive a tape head location signal, wherein the tape head location signal indicates that the tape drive has detected that the tape movement during the write operation has reached a turnaround point that is within a first distance of the beginning point of the tape;
   performing a read operation to read the first group of data from the tape by:
      moving the tape with respect to the read/write head aligned with the first track in the first direction from the beginning point to the ending point of the tape and, after reaching the ending point,
      aligning the read/write head with the second track and moving the tape with respect to the read/write head from the ending point in the direction opposite to the first direction to the turnaround point;
   receiving from the tape drive a second group of data read by the tape drive during the read operation; and
   comparing the first group of data to the second group of data.

2. The method of claim 1, wherein preparing the first group of data to be written to the tape further comprises:
   preparing a cache storage unit having a capacity equal to or larger than an amount of data that can be recorded in the write operation; and
   storing the first group of data to be written to the tape to the cache storage unit.

3. The method of claim 1, further comprising:
   determining that the first group of data does not match the second group of data; and
   performing a data verification error task.

4. The method of claim 3, wherein the data verification error task includes repeating the write operation.

5. The method of claim 3, wherein the data verification error task includes generating an error message.

6. The method of claim 1, wherein the first group of data includes one or more strings of data and the comparing of the first group of data to the second group of data further comprises:
   comparing a hash value calculated from a string of data of the first group of data with a hash value calculated from a corresponding string of data of the second group of data.

7. The method of claim 1, wherein the tape has a capacity to store a first quantity of data during the write operation, and wherein:
   the first distance is a longitudinal distance on the tape that corresponds with a second quantity of data that can be stored on one track, the second quantity of data being less than or equal to one percent of the first quantity of data.

8. A computer system for verifying data written to a tape, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   preparing a first group of data to be written to the tape, the tape having a plurality of longitudinal tracks;
   signaling a tape drive to perform a write operation to write the first group of data to the tape by:
      moving the tape with respect to a read/write head aligned with a first track in a first direction from a beginning point to an ending point of the tape and, after reaching the ending point,
      aligning the read/write head with a second track and moving the tape with respect to the read/write head from the ending point in a direction opposite to the first direction;
   receiving from the tape drive a tape head location signal, wherein the tape head location signal indicates that the tape drive has detected that the tape movement during the write operation has reached a turnaround point that is within a first distance of the beginning point of the tape;

performing a read operation to read the first group of data from the tape by:
  moving the tape with respect to the read/write head aligned with the first track in the first direction from the beginning point to the ending point of the tape and, after reaching the ending point,
  aligning the read/write head with the second track and moving the tape with respect to the read/write head from the ending point in the direction opposite to the first direction to the turnaround point;
receiving from the tape drive a second group of data read by the tape drive during the read operation; and
comparing the first group of data to the second group of data.

9. The computer system of claim 8, wherein preparing the first group of data to be written to the tape further comprises:
  preparing a cache storage unit having a capacity equal to or larger than an amount of data that can be recorded in the write operation; and
  storing the first group of data to be written to the tape to the cache storage unit.

10. The computer system of claim 8, further comprising:
  determining that the first group of data does not match the second group of data; and
  performing a data verification error task.

11. The computer system of claim 10, wherein the data verification error task includes repeating the write operation.

12. The computer system of claim 10, wherein the data verification error task includes generating an error message.

13. The computer system of claim 8, wherein the first group of data includes one or more strings of data and the comparing of the first group of data to the second group of data further comprises:
  comparing a hash value calculated from a string of data of the first group of data with a hash value calculated from a corresponding string of data of the second group of data.

14. The computer system of claim 8, wherein the tape has a capacity to store a first quantity of data during the write operation, and wherein:
  the first distance is a longitudinal distance on the tape that corresponds with a second quantity of data that can be stored on one track, the second quantity of data being less than or equal to one percent of the first quantity of data.

15. A computer program product for verifying data written to a tape, comprising:
  one or more non-transitory computer-readable storage media and program instructions stored on at least one of the one or more tangible storage media, the program instructions executable by a processor to cause the processor to perform a method comprising:
  preparing a first group of data to be written to the tape, the tape having a plurality of longitudinal tracks;
  signaling a tape drive to perform a write operation to write the first group of data to the tape by:
    moving the tape with respect to a read/write head aligned with a first track in a first direction from a beginning point to an ending point of the tape and, after reaching the ending point,
    aligning the read/write head with a second track and moving the tape with respect to the read/write head from the ending point in a direction opposite to the first direction;
  receiving from the tape drive a tape head location signal, wherein the tape head location signal indicates that the tape drive has detected that the tape movement during the write operation has reached a turnaround point that is within a first distance of the beginning point of the tape;
  performing a read operation to read the first group of data from the tape by:
    moving the tape with respect to the read/write head aligned with the first track in the first direction from the beginning point to the ending point of the tape and, after reaching the ending point,
    aligning the read/write head with the second track and moving the tape with respect to the read/write head from the ending point in the direction opposite to the first direction to the turnaround point;
  receiving from the tape drive a second group of data read by the tape drive during the read operation; and
  comparing the first group of data to the second group of data.

16. The computer program product of claim 15, wherein preparing the first group of data to be written to the tape further comprises:
  preparing a cache storage unit having a capacity equal to or larger than an amount of data that can be recorded in the write operation; and
  storing the first group of data to be written to the tape to the cache storage unit.

17. The computer program product of claim 15, further comprising:
  determining that the first group of data does not match the second group of data; and
  performing a data verification error task.

18. The computer program product of claim 17, wherein the data verification error task includes repeating the write operation.

19. The computer program product of claim 17, wherein the data verification error task includes generating an error message.

20. The computer program product of claim 15, wherein the first group of data includes one or more strings of data and the comparing of the first group of data to the second group of data further comprises:
  comparing a hash value calculated from a string of data of the first group of data with a hash value calculated from a corresponding string of data of the second group of data.

* * * * *